(12) United States Patent
Tsuzura et al.

(10) Patent No.: US 6,399,911 B1
(45) Date of Patent: Jun. 4, 2002

(54) GAS INSULATED SWITCHGEAR APPARATUS

(75) Inventors: Keiichi Tsuzura; Kazuhiko Takahashi; Junzo Kida, all of Hitachi; Minoru Yabuki, Tokai-mura; Yasuhito Watanabe, Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/363,188

(22) Filed: Jul. 29, 1999

(30) Foreign Application Priority Data

| Jul. 31, 1998 | (JP) | ........................... | 10-216827 |
| Oct. 30, 1998 | (JP) | ........................... | 10-309840 |

(51) Int. Cl.$^7$ ...................... H01H 33/00; H01H 33/70; H02B 1/20; H02B 5/00
(52) U.S. Cl. ........................ 218/43; 218/45; 218/80; 361/612; 361/618
(58) Field of Search .................. 218/43–84, 152–158; 361/600–640

(56) References Cited

U.S. PATENT DOCUMENTS 5,453,910 A 9/1995 Iton et al. .................. 361/612

FOREIGN PATENT DOCUMENTS

| JP | 63-75513 | 4/1988 |
| JP | 5-60113 | 3/1993 |

Primary Examiner—J. R. Scott
(74) Attorney, Agent, or Firm—Mattingly, Stanger & Malur, P.C.

(57) ABSTRACT

A gas insulated switchgear of the present invention, a plurality of disconnect switches are provided on a line connecting a bus line to a circuit-breaker in such a manner as to be arranged in both a main bus unit, a breaker unit or in both a first and second insulating gas sections. Accordingly, when an inconvenience occurs in the gas insulated switchgear apparatus and the exchange work of a unit is required, it is possible to exchange the inconvenient damaged unit only by turning the circuit including the inconvenient damaged unit into power supply interruption, that is, without turning a normal circuit unit into power supply interruption.

14 Claims, 14 Drawing Sheets

GAS INSULATED SWITCHGEAR APPARATUS

BACKGROUND OF THE INVENTION

1. Field of the Invention

The present invention relates to a gas insulated switchgear apparatus and, in particular, relates to a gas insulated switchgear apparatus that is connected between a pair of main bus lines.

2. Description of Related Art

The general gas insulated switchgear consists of three gas insulated switchgear bays. A gas insulated switchgear bay has a pair of main bus units and a breaker unit. And, these main bus units and the breaker unit are structurally separated through a spacer, and the main bus unit and the breaker unit contain an insulation gas of high pressure in each unit.

In case an accident occurs in the main bus unit or the breaker unit, it is necessary to exchange the main bus unit or the breaker unit. It is possible to separate the main bus unit and the breaker unit in the place of the spacer in case of exchange. However, one side of the above spacer reaches atmospheric pressure when the main bus unit or the breaker unit is exchanged, and part of the main bus electric line becomes exposed. Therefore, by opening the breaker of a breaker unit when the unit is exchanged, the breaker stops the electric power supply to the whole main. But the breaker stops also supplying electric power to a stability main bus when the breaker is opened and electric power transmission ability of the gas insulated switchgear is declined. U.S. Pat. No. 5,453,910 is mentioned as an example of such technology.

And, the prior art gas insulated switching apparatus is intended to miniaturize the apparatus by housing a plurality of devices including cable heads in one enclosed vessel of a line side unit. It is necessary to make the configuration of the line side unit to attach the breaker in the breaker unit which is perpendicularly turned on and off, so an exclusive frame which is located under the line side unit is used to make the high position configuration of the line side unit. However, there is a problem that the installation workability in the field was bad with respect to using the exclusive frame. The Japanese Patent Laid-open No. 1998-75513 and Japanese Utility Model Laid-open No. 1993-60113 are mentioned for examples of such technology.

SUMMARY OF THE INVENTION

An object of the present invention is to provide a gas insulated switchgear apparatus which takes into consideration inspection and maintenance of circuit breakers contained therein.

For achieving the above object, a gas insulated switchgear apparatus comprises, a breaker unit which connects to two said main bus units, which has a breaker which connects two electric power lines of said main bus unit, the breaker unit having a disconnect switch which is located on the electric line that is connected from said breaker to one of the main bus units.

And for achieving the above another object, a gas insulated switching apparatus of the invention includes a breaker unit and a line side unit, which comprises, an operating device disposed under said breaker unit, and a frame for supporting said line side unit that is fixed on a container of said operating device, with two legs of said frame on the side opposed to said operating device, which are removable.

DESCRIPTION OF THE PREFERRED EMBODIMENTS

Herein below, embodiments according to the present invention are explained with reference to the drawings.

Figure 1:
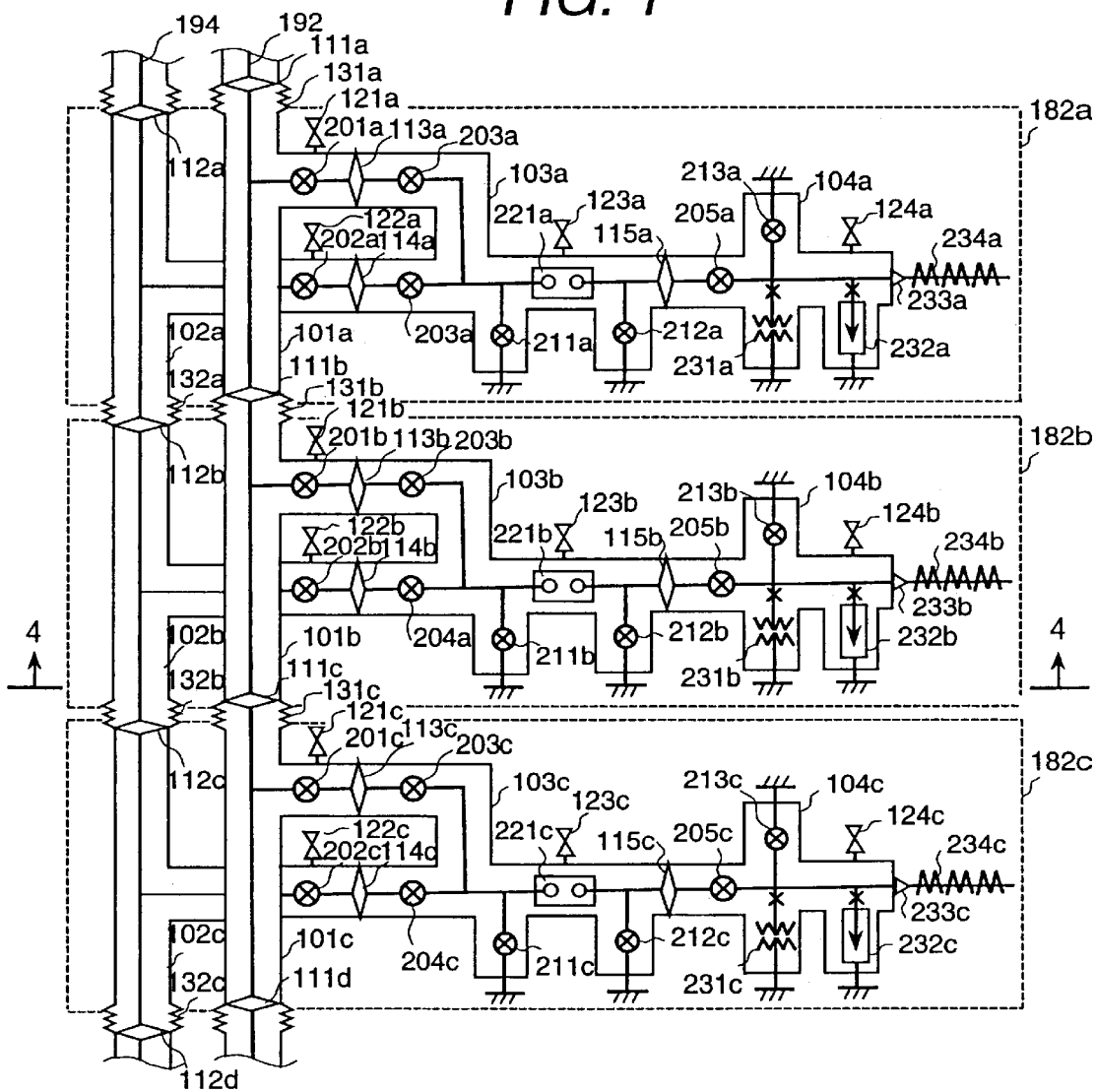
FIG. 1 is the wiring diagram that shows a gas insulated switchgear of this invention, which is a top view of the gas insulated switchgear.

FIG. 1 is the wiring diagram that shows a gas insulated switchgear of this invention, viewed from the upper part of the gas insulated switchgear. For example, FIG. 1 shows that the gas insulated switchgear consists of three gas insulated switchgear bays, and the gas insulated switchgear bay of this invention is used for two of the phases of the three-phase electric power line. A first phase of the three-phase electric power line 192 passes through the inside of the main bus unit 101*a,* 101*b* and 101*c* and a second phase of the three-phase electric power line 194 passes through the inside of the main bus units 102*a* 102*b* and 102*c*. The electric power of the three-phase electric power line 192, 194 is finally output from the line bus unit 104a, 104b and 104c.

One gas insulated switchgear bay 182b among the three gas insulated switchgear bays 182a 182b and 182c comprises a main bus unit 101b, a main bus unit 102b, a breaker unit 103b which connects to the main bus unit 101b and the main bus unit 102b, and a line bus unit 104b which connects to the breaker unit 103b. Main bus unit 101b is divided by spacers 111b, 111c and 113b. Main bus unit 102b is divided by spacers 112b, 112c and 114b. Breaker unit 103b is divided by spacers 113b, 114b and 115b. Breaker unit 103b prepares ground switches 211b and 212b, disconnect switches 203b and 204b and breaker 221b for a breaker on the line.

The main bus unit 101b has an insulating gas section partitioned by spacers 111b, 111c and 113b in which a disconnect switch 201b is provided and a bus line 192 insulatively supported by the spacers 111b, 111c and 113b is housed. The main bus unit 101b is connected to the adjacent main bus unit 101b via an expansion bellows 131b. Reference numeral 121a designates a gas valve through which an insulating gas is charged in or recovered from the main bus unit 101a.

The main bus unit 102b has an insulating gas section partitioned by spacers 112b, 112c and 114a in which a disconnect switch 202b is provided and a bus line insulatively supported by the spacers is housed. The main bus unit 102b is connected to the adjacent main bus unit 102b via an expansion bellows 132b. Reference numeral 122b designates a gas valve through which an insulating gas is charged in or recovered from the main bus unit 102b. Breaker unit 103b has disconnect switch 203b on the connecting line with main bus unit 101b, and prepares disconnect switch 204b on the connecting electric power line with main bus unit 102b. Then, each gas insulated switchgear bay 182a, 182c has the similar composition of the gas insulated switchgear bay 182b.

The breaker unit 103b has an insulating gas section partitioned by spacers 113b, 114b and 115b. The main bus unit 101a and main bus unit 102c are connected to one side of the breaker unit 103b and the line bus unit 104b is connected to the other side of the breaker unit 103b. Reference numeral 123b designates a gas valve through which an insulating gas is charged in or recovered from the breaker unit 103b.

The line bus unit 104b has an insulating gas section partitioned by a spacer 115b and a cable head 233b in which a disconnect switch 205b, an earth switch 213b for a line, a current transformer 231b for an instrument, and a lightning arrestor 232b, which are provided on the line connected to the breaker unit 221b, are housed. A current transformer 234a is provided on the line extending outwardly from the line bus unit 104b via the cable head 233b. Reference numeral 124b designates a gas valve through which an insulating gas is charged in or recovered from the line bus unit 104b.

When there occurs an inconvenience or trouble in the prior art gas insulated switching apparatus, an accident can arise when using a breaker unit 103b that has no disconnect switch 203b and 204b. The operation which leads to such an accident in the prior art is explained as follows.

Here, it is assumed that an inconvenience or trouble has occurred in the main bus unit 101b; the inconvenience has been removed by the circuit-breaker operated on the basis of a sequence of protective activations of a relay; and the main bus units 101a, 101b, 101c, . . . , 101n are separated from each other by the disconnectors into power supply interrupted states.

When the trouble occurs at the main bus unit 101b, disconnectors 201a, 201b, 201c, . . . , 201n are opened. Here, since the gas insulated switching apparatus is of a double bus line type, a power is supplied to respective circuits via the main bus units 102a, 102b, 102c, . . . , 102n, the breaker units 103a, 103b, 103c, . . . , 103n, and the line bus units 104a, 104b, 104c, . . . , 104n.

To restore the gas insulated switching apparatus, it is required to exchange and repair the troubled main bus unit 101b. First, the insulating gas charged in each of the main bus unit 101b and the main bus unit 101c connected thereto via the expansion bellows 131c is recovered. Also the insulating gas charged in each of the breaker units 103b and 103c connected to these bus line units is recovered, the pressure of the insulating gas is reduced to about atmospheric pressure.

Each of the spacers 113 and 114 between the bus line unit and breaker unit has a structure being fixed to both the bus line unit side and breaker unit side. Accordingly, one of the units can be separated from the spacer. However, since the pressure of the insulating gas in a usual service state of the gas insulated switching apparatus is high, the insulating gas in each of the breaker units 103b and 103c is recovered or the pressure of the insulating gas is reduced to about atmospheric pressure for ensuring safety as described above.

In the breaker units 103b and 103c in which the pressure of the insulating gas is reduced to cope with the trouble, since the insulating performance is lower than that in the usual service state, there may occur dielectric breakdown due to invasion of an external surge overvoltage, an arcing short-circuit circuit in air or electric shock due to exposure of the charging portions at ends of the breaker units 103b and 103c. For this reason, before the recovery of the insulating gas or reduction in the pressure of the insulating gas, the circuit breakers 221b and 221c and disconnectors 201b, 201c, 205b and 205c are opened, and the earth switches 211b, 211c, 212b and 212c are closed. This means that two circuits, particularly, one of which is the normal adjacent circuit, are subjected to power supply interruption.

After completion of the power supply interruption work, the insulating gas is recovered or the gas pressure is reduced to about atmospheric pressure, and then the bellows 131b and 131c are compressed with the spacer 113b fixed an the breaker unit 103b side to separate the conductors, whereby the main bus unit 101b is removed. After that, the main bus unit 101b is temporarily restored using a temporary main bus unit 101z, or the main bus unit 101b having been repaired is assembled again. The restoration of the bus unit 101b is thus completed.

The above method has a problem that the adjacent normal circuit must be subjected to power supply interruption for restoration of the troubled bus line unit. To solve such a problem, according to this embodiment, there is provided the configuration shown in FIG. 1, in which the disconnect switch 203a, 203b, 203c, 204a, 204b and 204c for the circuit-breakers are provided on the lines between the main bus line and the breakers in such a manner as to be arranged in the associated breaker units.

According to this embodiment having the above configuration, when there occurs the above-described inconvenience, in the breaker unit 103c, the disconnect switch 203c for a circuit-breaker is opened in place of opening the circuit breaker 221c and disconnect switch 201c and 205c, so that a charging portion is not exposed to air in the breaker unit 103c. This enables power to be supplied to the adjacent circuit even during the restoration work.

Further, after the removal of the main bus unit 101b is completed, the spacer 113b is fixed and the end portion protective cover is mounted, and at this time, if a fear of explosion of the spacer 113b by gas pressure is eliminated, the power supply to the troubled circuit can be re-started before restoration of the main bus unit 101b by opening the disconnect switch 203b and earth switches 211b and 212b and closing the disconnect switch 202b, 204b and 205b and circuit breaker 221b.

Accordingly, it is possible to minimize the number of power supply interrupted portions upon restoration of the inconvenient portion, and to recover the power supply ability of the normal circuit after temporary restoration to the degree comparable to that before occurrence of the inconvenience. As is apparent from the symmetry of the bus line structure, the measures against an inconvenience which may occur at the main bus unit 102b can be taken in the same manner as that for the main bus unit 101b.

A method of handling trouble that occurs in a breaker unit will be described below. Here, it is assumed that the trouble has occurred at the breaker unit 103b; the trouble has been excluded by the circuit-breaker operated on the basis of a sequence of protective activations of a relay; and the breaker unit 103b has been cutoff by the disconnect switch 201b and 202b into the power supply interrupted state.

When the trouble occurs at the breaker unit 103b, the line bus unit 104b is also turned into power supply interruption. The power supply to respective circuits is performed from the main bus units 101a, 101b, 101c, . . . , 101n and the main bus unit 102a, 102b, 102c, . . . , 102n via the normal breaker units 103a, 103c, . . . , 103n and the normal line bus units 104a, 104c, . . . , 104n.

For restoration of the gas insulated switching apparatus, it is required to exchange and repair the breaker unit 103b, and for this purpose, it is first required to recover the insulating gas charged in each of the breaker unit 103b and the main bus units 101b and 102b and the line bus unit 104b connected to the breaker unit 103b or reduce the pressure of the insulating gas to about atmospheric pressure.

To be more specific, in order to remove the breaker unit 103b, the line bus unit 104b is required to be removed, and further, since either the main bus units 101a, 101b, 101c, . . . , 101n or the main bus units 102a, 102b, 102c, . . . , 102n must be rendered in an operable state at a rating gas pressure even in the case of exchange of the troubled unit, either the main bus unit 101b or the main bus unit 102b is required to be exchanged for a temporary main bus unit 101z.

In the following description, it is assumed that the main bus unit 101b is exchanged for the temporary bus line unit 101z. For the prior art gas insulated switching apparatus in which the breaker unit 103a, 103b, 103c has no disconnect switches 203a, 203b, 203a, 204c, 204b and 204c, the disconnect switches 201a, 201b, 201c, . . . , 201n in the main bus units are opened to turn the main bus units into power supply interruption. Then, in the circuit including the breaker unit 103b to be exchanged and repaired, the circuit breaker 221b and the disconnect switch 203b and 205b are opened and the earth switches 211b, 212b and 213b are closed, and then the insulating gas charged in each of the main bus unit 101b and the main bus unit 101c connected thereto via the expansion bellows 131c is recovered. The insulating gas charged in each of the breaker unit 103b and the line bus unit 104b is also recovered.

At this time, an end portion of the breaker unit 103c in the adjacent circuit has a potential for an arcing short-circuit in air and/or electric shock via a charged portion exposed in air, and to cope with such a short circuiting potential, the circuit breaker 221c and the disconnect switch 202c and 205c are opened and the earth switches 211c and 212c are closed, so that even the normal adjacent circuit is turned into power supply interruption.

After completion of such a power supply interruption work, the bellows 131b and 131c are compressed to cut off conductors, and the main bus unit 101b is removed and exchanged for the temporary main bus unit 101z. As compared with the main bus unit 101b, the temporary main bus unit 101z has no branch line to be connected to the breaker unit. After completion of exchange for the temporary main bus unit 101z, the insulating gas is charged in each of the temporary main bus unit 101z and the main bus unit 101c again up to the rating pressure, and the disconnect switches 201a, 201c, 201n are closed, to restore the main bus units into the energizable state. After that, the earth switches 211c and 212c are opened and the circuit breaker 221c and the disconnect switch 205c are closed, to restore the normal circuit which has been subjected to power supply interruption during the main bus unit exchange work.

Next, to separate the breaker unit 103b from the main bus unit 102b, the disconnect switch 202a, 202b, 202c, . . . , 202n in the main bus units are opened, to turn the main bus units into power supply interruption.

Here, each of the spacers 113 and 114 between the bus line unit and the breaker unit has a structure being fixed to both the bus line unit and the breaker unit, and therefore, either the bus line unit or the breaker unit can be separated from the spacer. However, since the pressure of the insulating gas in the gas insulated switching apparatus in the normal service state is high, the insulating gas in the bus line B unit 102b is recovered or the pressure of the insulating gas is reduced to about atmospheric pressure for ensuring safety.

In the main bus unit 102b in which the pressure of the insulating gas is reduced to cope with occurrence of the inconvenience, however, there may occur dielectric breakdown by invasion of external surge overvoltage because the insulating performance of the main bus unit 102b is lower than that in the normal service state, and therefore, the main bus units are turned into power supply interruption. After completion of the power supply interruption work, the insulating gas is recovered. to reduce the gas pressure to about atmospheric pressure, and the line bus unit 104b and the breaker unit 103b are removed in this order with the spacer 114b left fixed on the main bus unit 102b side.

The restoration of the main bus units 102b is performed as follows: namely, the main bus unit 102b is exchanged for the temporary main bus unit 101z like the main bus unit 101b or a protective cover is mounted on the end portion of the branch line, to be connected to the breaker unit 103b, of the main bus unit 102b to eliminate the fear of explosion or electric shock at the spacer 114b; the insulating gas is charged again in the main bus unit 102b up to the rating pressure; and the disconnect switch 202a, 202c, . . . , 202n are closed to restore the main bus units into the operational state.

In the above method, there occurs a problem that even the normal adjacent circuit is switched to a power supply interruption state. To solve such a problem, this embodiment provides the above configuration. According to this embodiment, when the above described trouble occurs in the breaker unit 103c, the disconnect switch 203c is opened in place of opening the circuit breaker 221c and the disconnect switch 201c and 205c in the breaker unit 103c, to thereby prevent a charging portion from being exposed to air in the breaker unit 103*c*. With this configuration, power can be supplied to the adjacent circuit even during the restoration work, and further after completion of the exchange of the main bus unit 101*b*, the operation of the main bus units can be restarted by closing the disconnect switches 201*a*, 201*b*, 201*c*, . . . , 201*n*.

Figure 2:
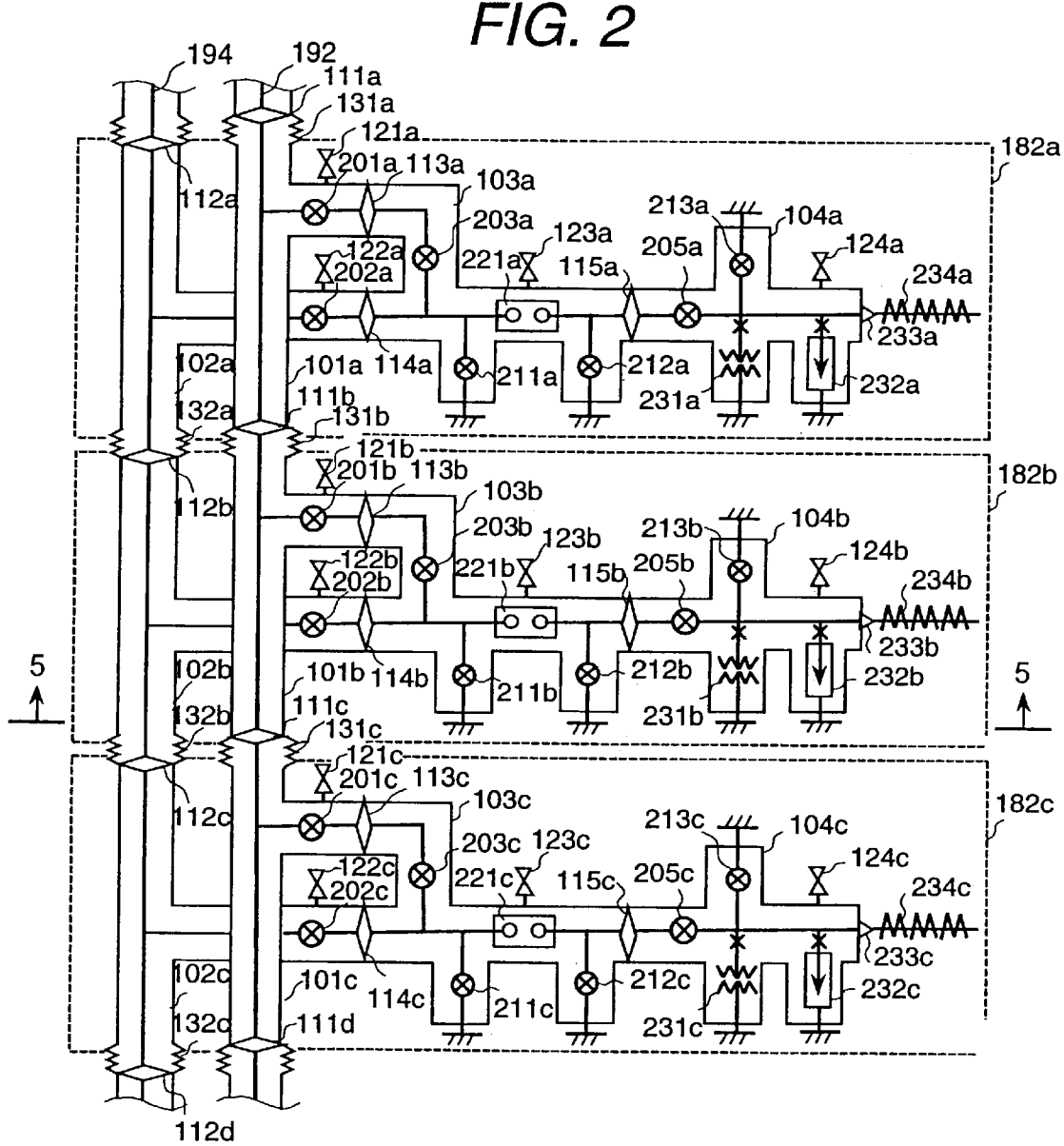
FIG. 2 is a top view of a gas insulated switchgear according to another embodiment.

FIG. 2 is a connection diagram showing a gas insulated switchgear according to a second embodiment.

In this embodiment, a disconnect switch 203*b* for a circuit-breaker is provided in a line between the bus line of main bus unit 101*b* and the circuit breaker 221*b*. In this case, the power supply interruption of the normal circuit upon the above-described accident restoration work can be avoided only when an inconvenience or trouble occurs in one of the main bus unit 101*a*, 101*b*, 101*c*, . . . , 101*n* and the breaker unit 103*a*, 103*b*, 103*c*, . . . , 103*n*. The other configuration is the same as that in the previous embodiment therefore.

The previous embodiment deals with trouble occurring in one of the three units, that is, the main bus unit 101*b*, bus line unit 102*b*, and circuit breaker 221*b* by adding two disconnect switches for each circuit; while this embodiment deals with trouble occurring in one of the two kinds of units, that is the main bus unit 101*b* or 102*b*, and circuit breaker 221*b* by adding one disconnect switch for each circuit. In other words, according to this embodiment, there can be obtained a relatively desirable effect by adding fewer devices than that of the circuit breaker added in the previous embodiment.

Figure 3:
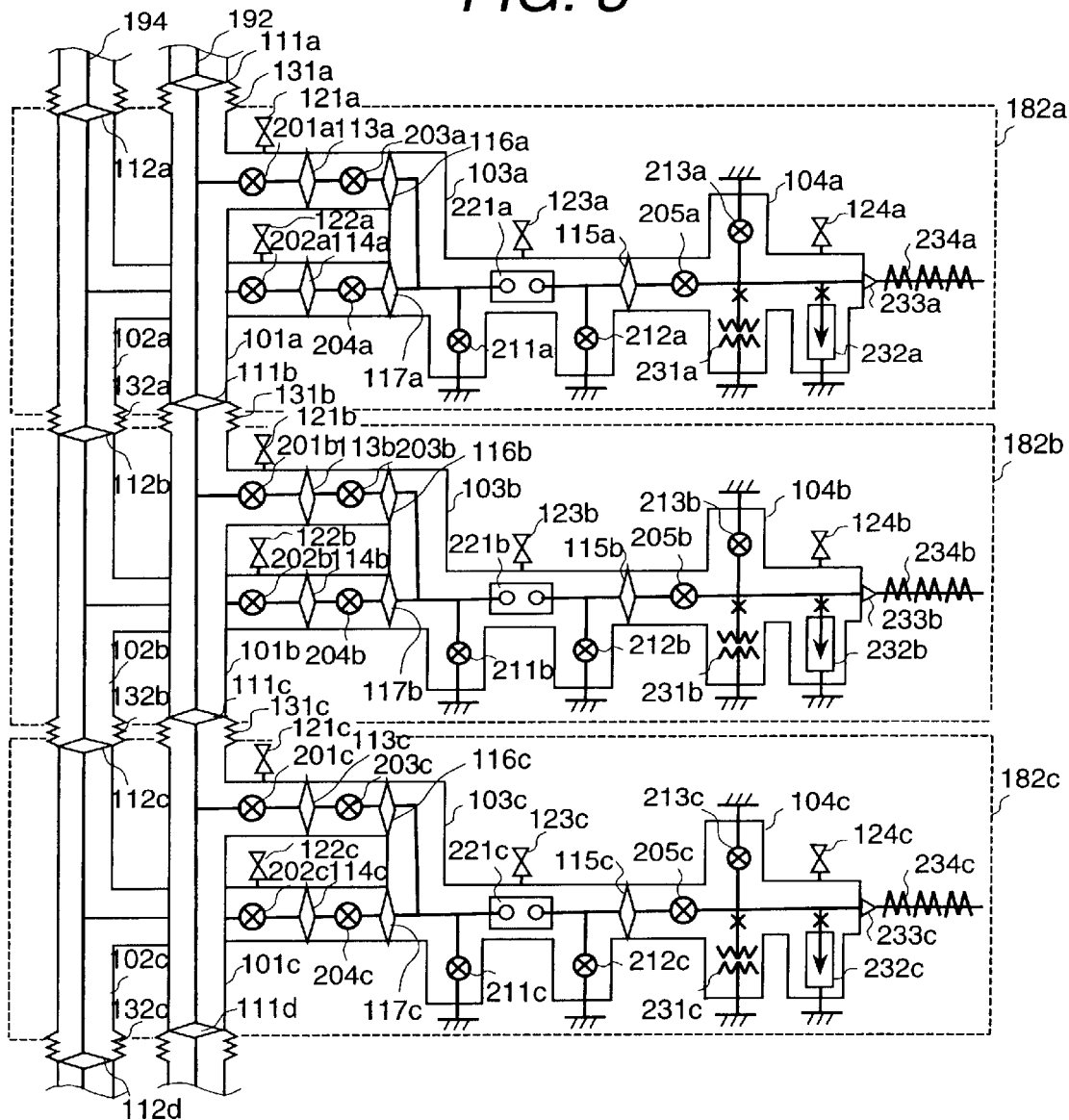
FIG. 3 is a top view of a gas insulated switchgear according to another embodiment.

FIG. 3 is a connection diagram showing a gas insulated switchgear according to a third embodiment. In this embodiment, a new insulating gas section is formed between the main bus unit 101*b* and the breaker unit 103*b* by providing a spacer 116*b* and also a new insulating gas section is formed between the main bus unit 102*b* and the breaker unit 103*b* by providing a spacer 117*b* and disconnect switches 201*b* and 202*b* for circuit-breakers are arranged in the former and latter insulating gas sections respectively. The other parts of the configuration are the same as that in the previous embodiments.

The circuit breaker 221*b* is often checked or is replaced because it breaks a large current such as a short-circuit current or grounding current, while the disconnect switches 203*b* and 204 are consumed to a lesser extent because each breaks a small current.

Accordingly, the number of maintenance checks of the breaker unit 103 may be larger than that of each of the disconnect switches 203*b* and 204. In this regard, according to this embodiment, upon maintenance of the breaker unit 103, the disconnect switches 203*b* and 204*b* which are made independent of the breaker unit 103*b* are not required to be subjected to gas recovery and exposure to atmospheric pressure so that it is possible to enhance the reliability of the gas insulated switchgear.

Figure 4:
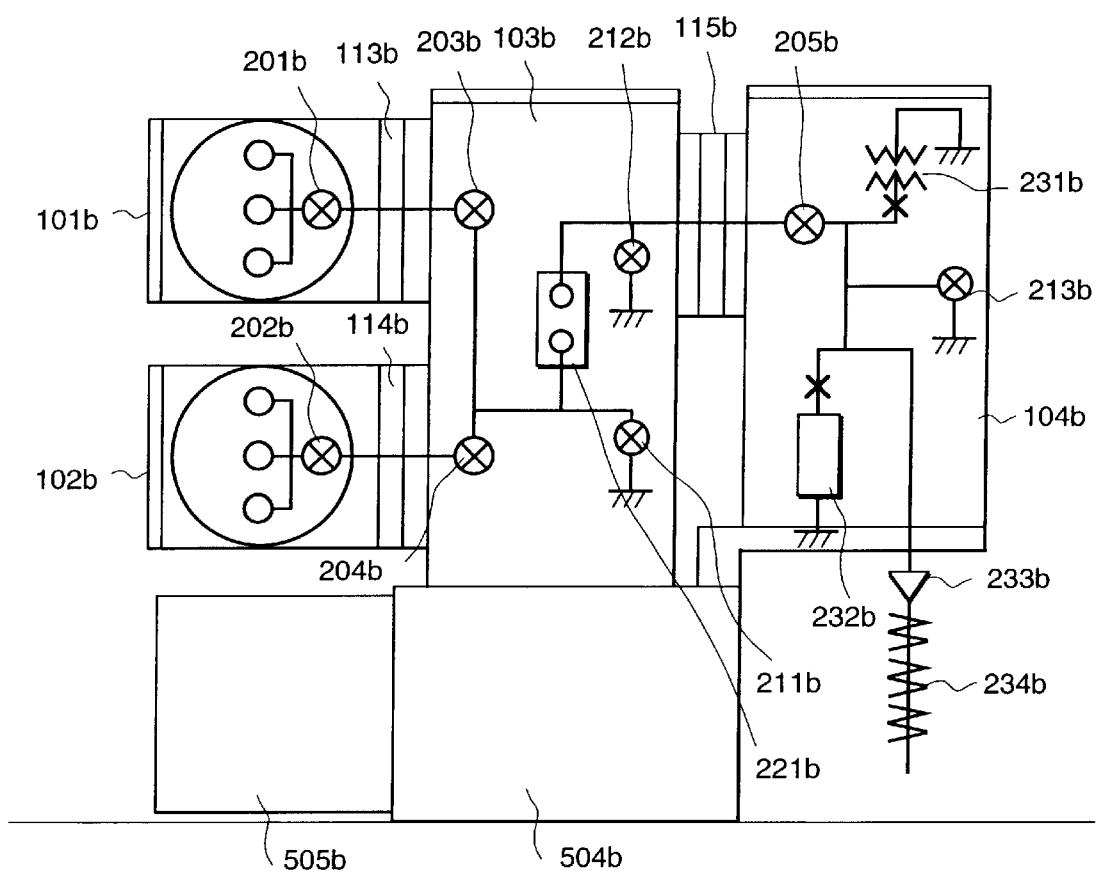
FIG. 4 is a side view of the gas insulated switchgear shown in FIG. 1 taken along 4—4.

FIG. 4 is a sectional side view showing the arrangement and internal configuration of the gas insulated switching apparatus shown in FIG. 1 taken along line 4—4. In the gas insulated switching apparatus, the breaker unit 103*b* is arranged on the upper portion of an operation device 504 in which control devices are housed. The main bus unit 101*b* and main bus unit 102*b* stacked in the vertical direction are connected to one side of the breaker unit 103*b*, and the line bus unit 104*b* is connected to the other side of the breaker unit 103*b*.

According to this embodiment, in the breaker unit 103*b*, the disconnect switches 203*b* and 204*b* for the circuit-breakers are arranged on the main bus unit side with respect to the circuit breaker 221*b*, and the earth switches 211*b* and 212*b* for the circuit-breakers are arranged on the line bus unit side with respect to the circuit breaker 221*b*. With this arrangement, it is possible to optimize the arrangement of the components in the breaker unit, that is, efficiently house the components in the breaker unit, and hence miniaturize the breaker unit.

Figure 5:
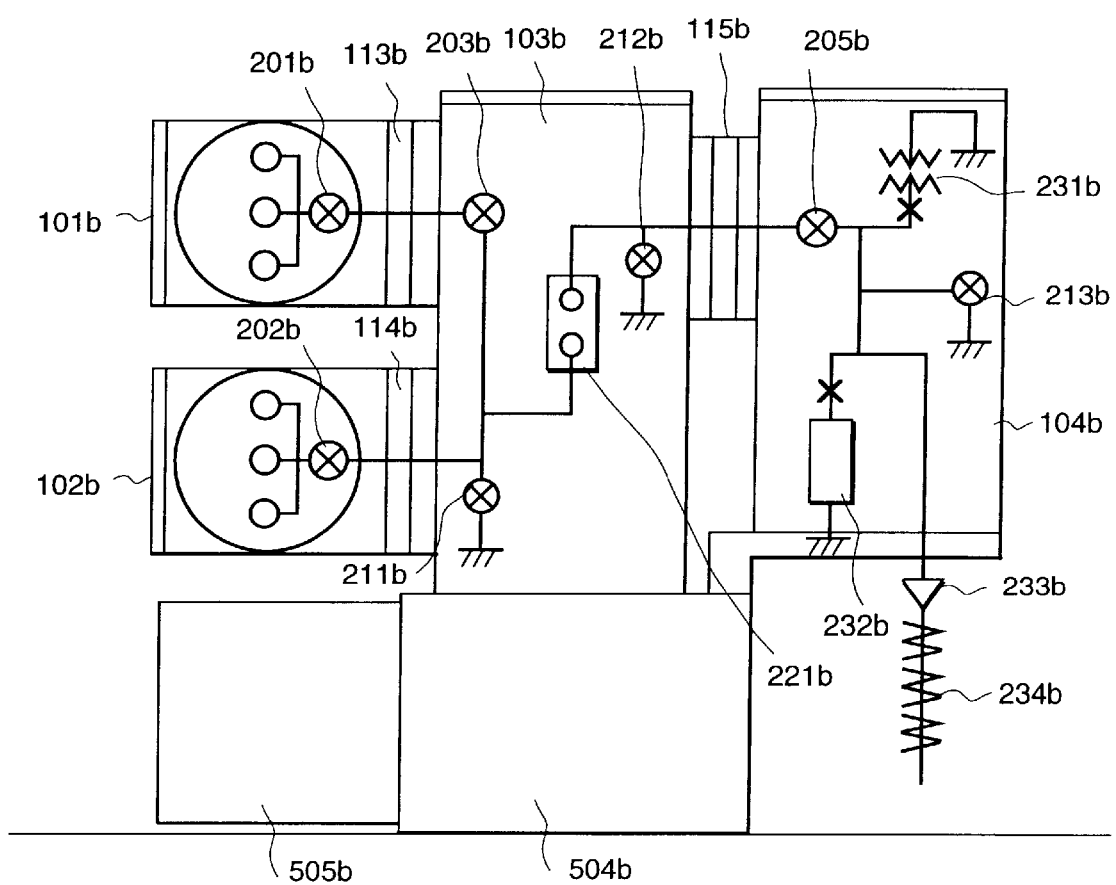
FIG. 5 is a side view of the gas insulated switch gear shown in FIG. 2 taken along line 5—5.

FIG. 5 is a sectional side view showing the arrangement configuration and internal configuration of the gas insulated switchgear apparatus taken along line 5—5 shown in FIG. 2. In this embodiment, the disconnect switch 203*b* for a circuit-breaker is provided on the line between the main bus unit 101*b* and the breaker 221*b*, and the earth switch 211*b* is arranged at the position at which the disconnect switch 204*b* for a breaker is provided in the previous embodiment.

With this arrangement, the degree of freedom in arrangement of the earth switch 211*b* for the breaker is increased, and hence the arrangement configuration of the components in the breaker unit are optimized.

Figure 6:
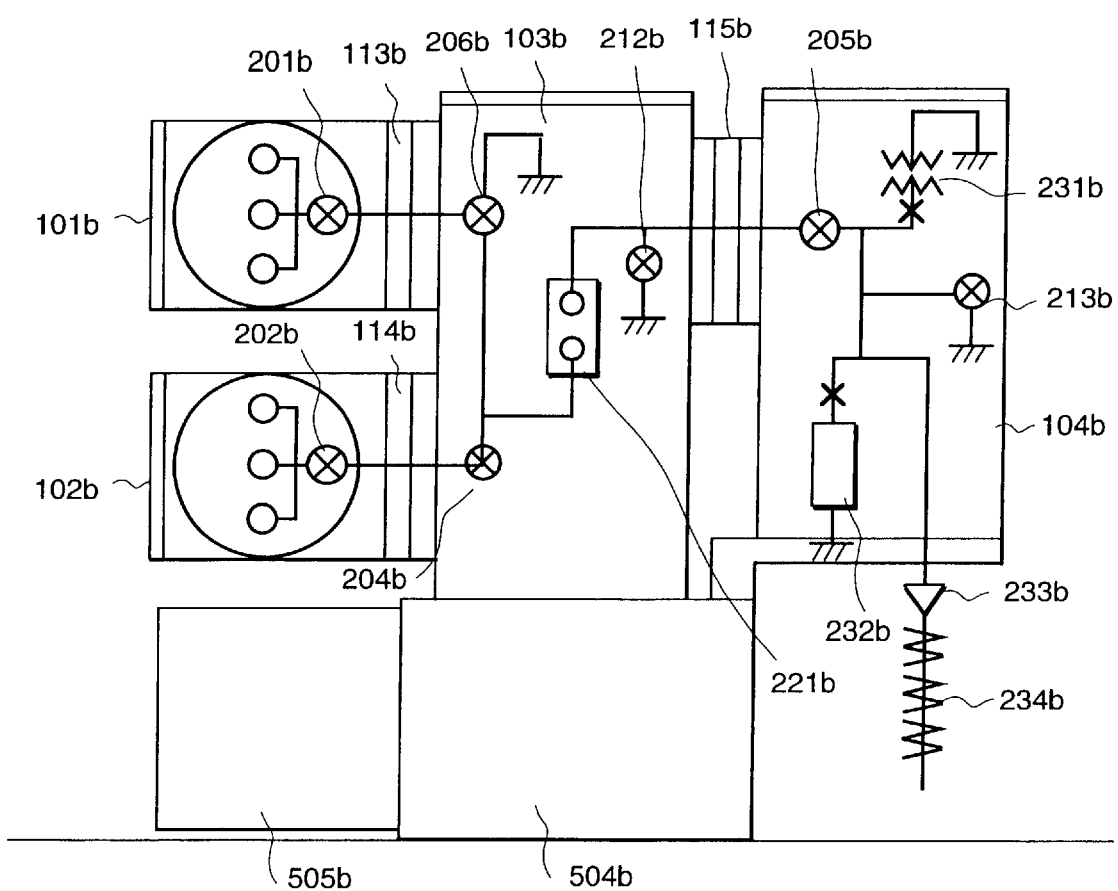
FIG. 6 is a side view of a gas insulated switchgear according to another embodiment of the switchgear shown in FIG. 4.

FIG. 6 is a modification of the gas insulated switchgear apparatus shown in FIG. 4. In this embodiment, the disconnect switch 203*b* for a breaker is configured to additionally exhibit the function of the earth switch 211*b* for a breaker. With this configuration, it is possible to reduce the number of the components housed in the unit while keeping the same total function as that of the embodiment shown in FIG. 4, and hence to miniaturize the breaker unit.

Figure 7:
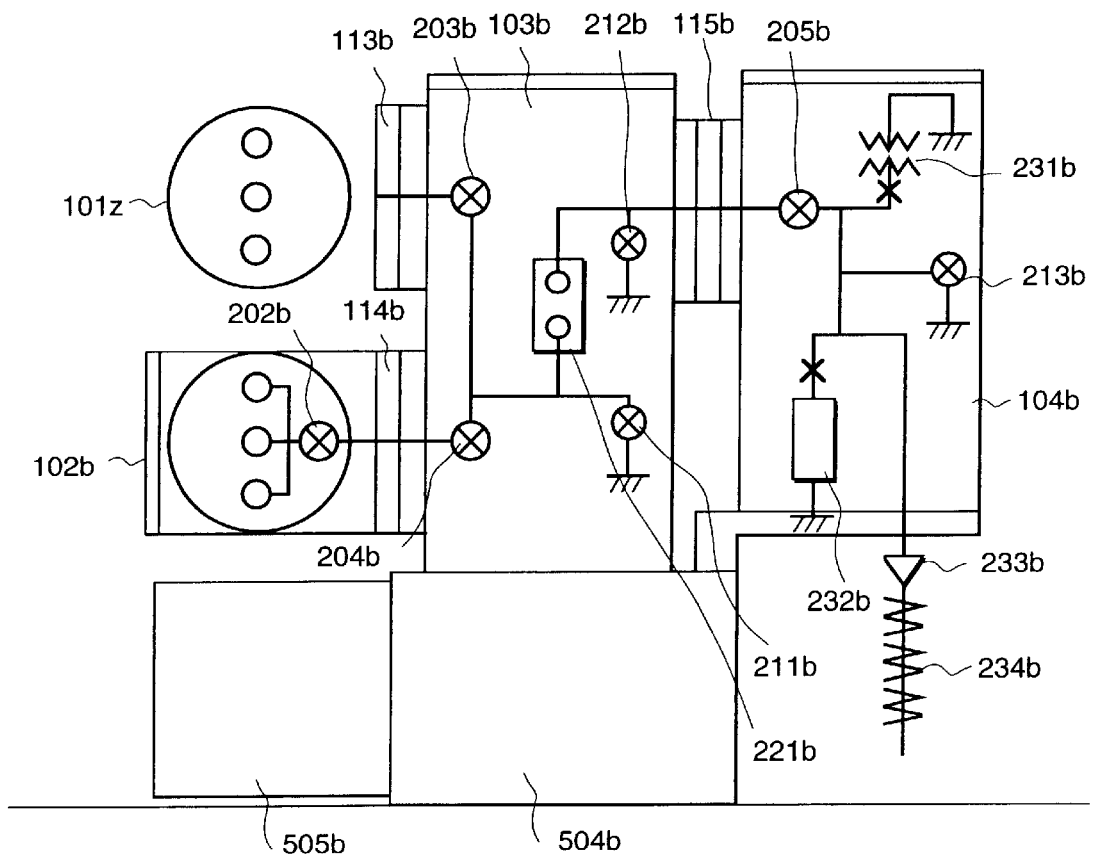
FIG 7 is a sectional side view of the gas insulated switch gear shown in FIG. 1, in which a bus line unit is exchanged for a temporary bus line unit.

FIG. 7 shows the configuration of the gas insulated switchgear apparatus in which the main bus unit 101*b* is exchanged for the temporary main bus unit 101*z* upon the exchange work of the main bus unit 101*b* in the embodiment shown in FIG. 1. Since the temporary main bus unit 101*z* is independent of the breaker unit 103*b*, it is possible to exchange the breaker unit 103*b* connected to the bus line while keeping the activation of the bus line by use of the temporary main bus unit 101*z*, and hence to avoid the power supply interruption of an electric station.

Figure 8:
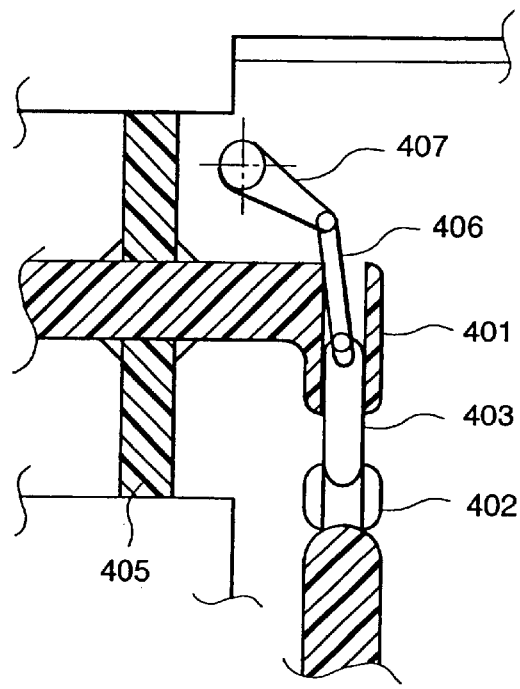
FIG. 8 is a sectional view of one configuration example of the disconnecting switch of FIG. 1, FIG. 2, FIG. 3 and FIG. 6 illustrating the "ON" state.
Figure 9:
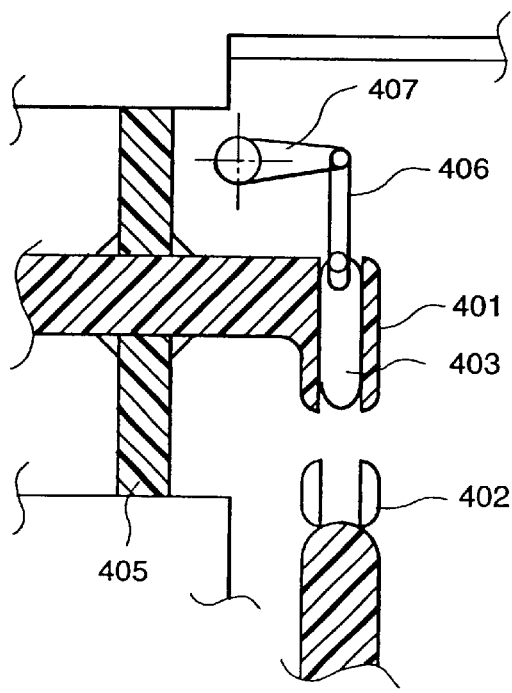
FIG. 9 is a sectional view of one configuration example of the disconnecting switch of FIG. 8, illustrating the "OFF" state.

FIGS. 8 and 9 show one configuration example of the disconnect switch for a breaker described above, wherein FIG. 8 shows the "ON" state and FIG. 9 shows the "OFF" state. The disconnect switch for a breaker in this embodiment includes a movable side conductor 401 supported by a spacer 405, a fixed side conductor 402, a movable electrode 403, an insulating rod 406, and an operating lever 407.

The leading end of the movable side conductor 401 has a through-hole through which the movable electrode 403 is movable in the vertical direction. The movable electrode 403 is coupled with the insulating rod 406 which is in turn connected to the operating lever 407. The insulating rod 406 is movable in the vertical direction by a turning motion of the operating lever 407. The leading end of the fixed side conductor 402 has a coupling in which the movable electrode 403 can be fitted. The operating lever 407 is connected to an external operating mechanism.

The disconnect switch for a breaker is used, as described above, when the exchange work of a unit in the gas insulated switchgear apparatus is required, so that the disconnect switch has an interlock mechanism so an not to be operated in a usual operation of an electric station. And the operational force of the disconnect switch for a breaker is small. Accordingly, the disconnect switch for a breaker can be manually operated, or it can be operated via an operational mechanism using the rotational force of a motor or the biasing force of a spring as a drive force.

Figure 10:
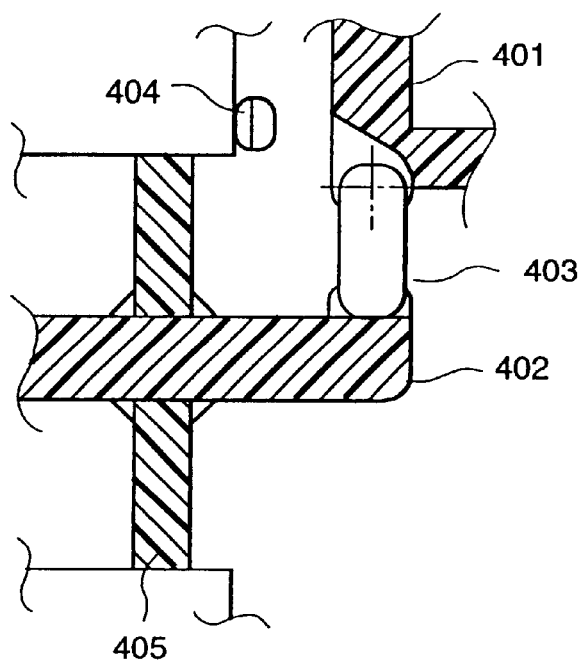
FIG. 10 is a sectional view of another configuration example of the disconnecting switch of FIG. 1, FIG. 2, FIG. 3 and FIG. 6 illustrating the "ON" state.
Figure 11:
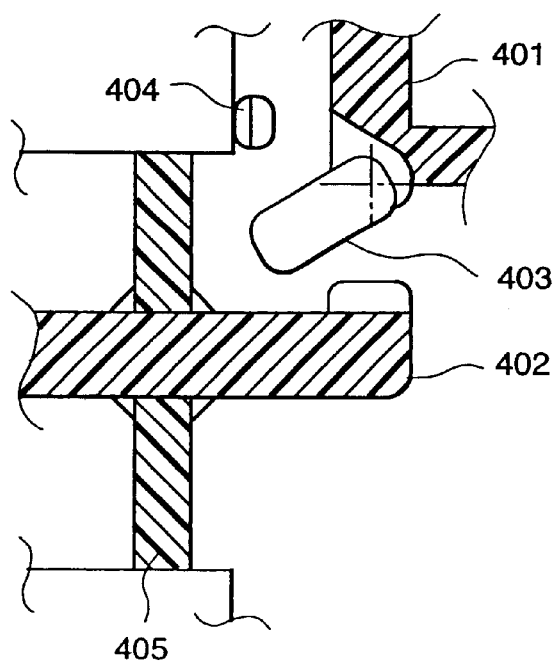
FIG. 11 is a sectional view of one configuration example of the disconnecting switch of FIG. 10, illustrating the "OFF" state.
Figure 12:
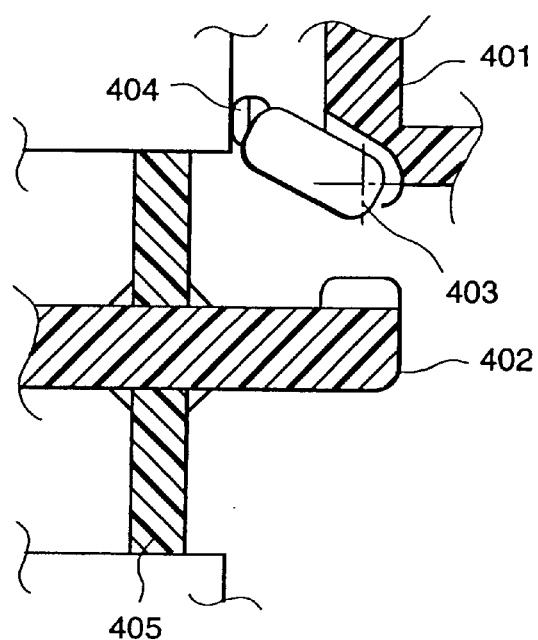
FIG. 12 is a sectional view of one configuration example of the disconnecting switch of FIG. 10, illustrating the "Ground" state.

FIGS. 10 to 12 show another configuration example of the disconnect switch for a breaker. The disconnect switch for a breaker in this embodiment has a disconnecting function and a grounding function. In order to achieve the above two functions, a movable electrode 403 is rotatably connected to a movable side conductor 401, and a ground conductor 404 is provided on a tank portion.

Upon usual operation at an electric station, the movable electrode 403 is, as shown in FIG. 10. in contact with a fixed side conductor 402 to establish the "ON" state. When the exchange work of a unit is required, the movable electrode 403 is rotated to establish the "OFF" state as shown in FIG. 11, and further the movable electrode 403 is rotated to be brought in contact with the ground conductor 404 as shown in FIG. 12, that is, to establish the "Ground Earth" state. It should be noted that the disconnect switch for the breaker in this embodiment may be configured to have the interlock mechanism described in the previous embodiment and to be operated in the same manner as that in the previous embodiment.

Figure 13:
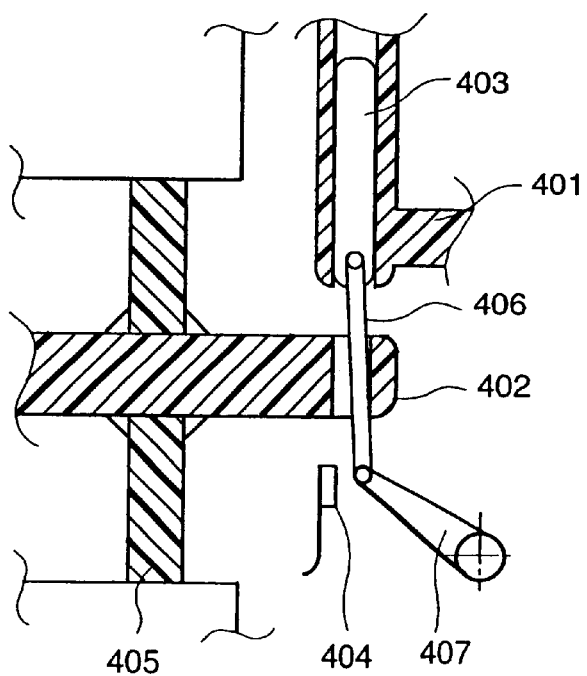
FIG. 13 is a sectional view of another configuration example of the disconnecting switch of FIG. 1, FIG. 2, FIG. 3 and FIG. 6 illustrating the "OFF" state.
Figure 14:
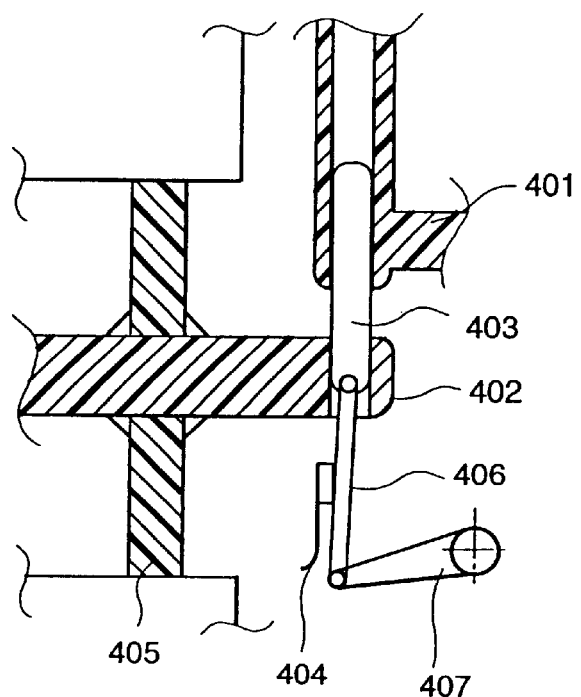
FIG. 14 is a sectional view of one configuration example of the disconnecting switch of FIG. 13, illustrating the "ON" state.
Figure 15:
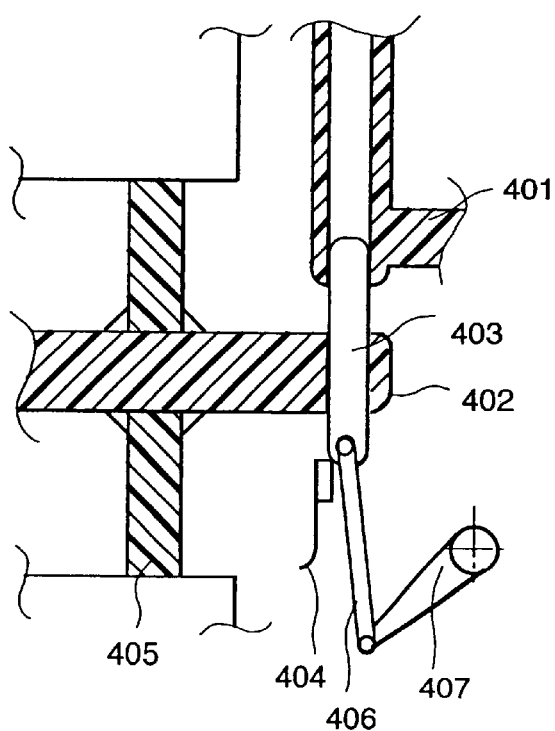
FIG. 15 is a sectional view of one configuration example of the disconnecting switch of FIG. 13, illustrating the "Ground" state.

FIGS. 13 to 15 show a further configuration example of the disconnect switch for a breaker. The disconnect switch for a breaker in this embodiment, which has also a disconnecting function and a grounding function, is configured such that both a movable electrode 403 and a fixed side conductor 402 are grounded. To be more specific, a movable side conductor 401 has a cylinder hole in which the movable electrode 403 can be inserted in the same manner as that of a piston.

The fixed side conductor 402 has a through-hole at a portion facing to the cylinder hole of the movable side conductor 401. The movable electrode 403 is joined to an insulating rod 406 through the through-hole of the fixed side conductor 402. The insulating rod 406 is connected to an operating lever 407 in such a manner as to be movable in the vertical direction by turning motion of the operating lever 407.

Upon a usual operation at an electric station, the movable electrode 403 is, as shown in FIG. 13, inserted in the through-hole of the fixed side conductor 402 to establish the "ON" state. When the exchange work of a unit is required, the movable electrode 403 is moved up to be inserted in the cylinder hole of the movable side conductor 401 as shown in FIG. 13. to establish the "OFF" state. And the movable electrode 403 is moved down to a position lower than the position in the state shown in FIG. 13 to be brought in contact with the ground conductor 404 as shown in FIG. 15, to establish the "Ground Earth" state. At this time, the movable electrode 403 is in contact with three points, that is, the movable side conductor 401, fixed side conductor 402, and ground conductor 404. In other words, at the ground position of the movable electrode 403, both the movable side conductor 401 and fixed side conductor 402 can be grounded. It should be noted that the disconnect switch for a breaker in this embodiment may be configured to have the interlock mechanism described in the previous embodiment and to be operated in the same manner as that in the previous embodiment.

According to the gas insulated switchgear of the present invention, a plurality of disconnect switches are provided on a line connecting a bus line into a circuit-breaker in such a manner as to be arranged in both a bus line unit and a breaker unit or in both first and second insulating gas sections. Accordingly, when an inconvenience or trouble occurs in the gas insulated switchgear apparatus and the exchange work of a unit is required, it is possible to exchange the troubled unit only by turning the circuit including the troubled unit into power supply interruption, that is, without turning a normal circuit into power supply interruption. As a result, this invention provide the gas insulated switchgear apparatus capable of inspecting and repairing a troubled portion while minimizing the number of power supply interrupted unit portions, and provide the gas insulated switchgear apparatus capable of recovering for a short time, the power supply ability comparable to that before occurrence of the trouble by use of portions other than the troubled portion.

FIG. 16 to FIG. 19 are used to explain one practical example.

Figure 16:
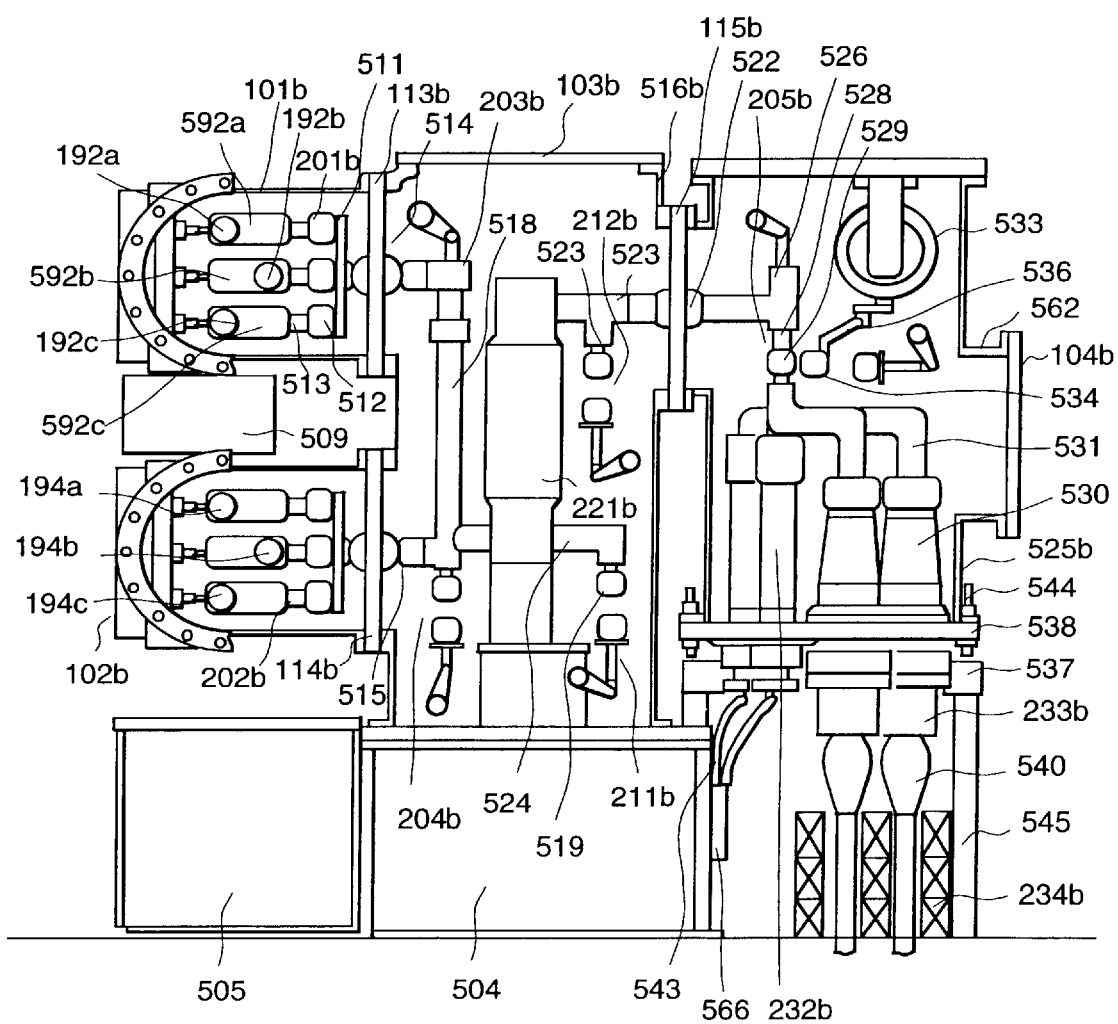
FIG. 16 is a more detailed practical example of FIG. 4.
Figure 17:
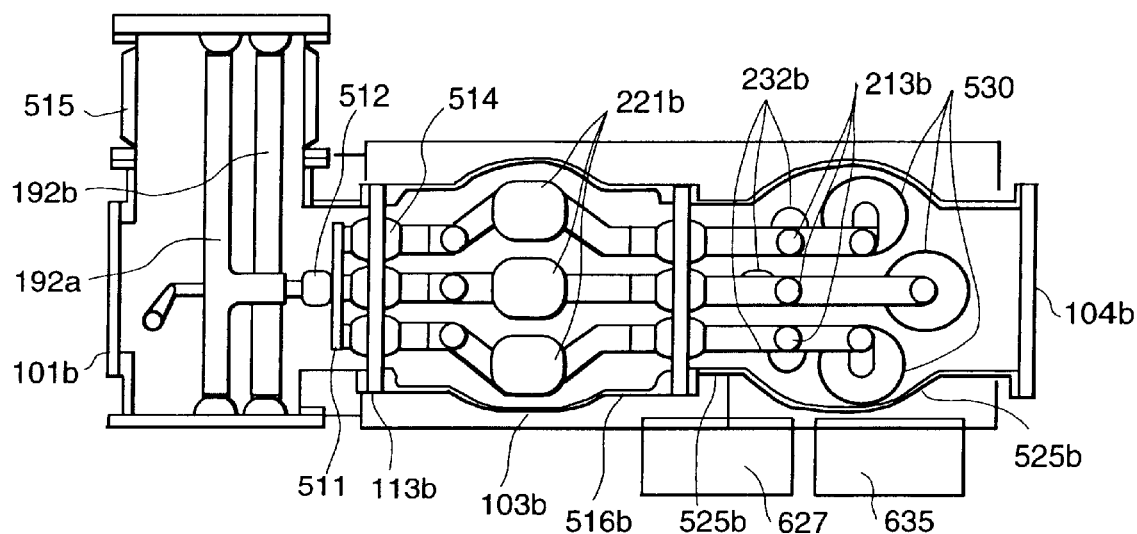
FIG. 17 is a top view of gas insulated switchgear of FIG. 16.

FIG. 16 and FIG. 17 are detailed practical examples of FIG. 4. As shown in FIGS. 16 and 17, a gas insulated switching apparatus in this embodiment includes main bus units 101*b* and 102*b*, breaker unit 103*b*, and a line bus unit 104*b*. Two pieces of the main bus units 101*b* 102*b* are provided in the vertical direction on one side of the breaker unit 103*b*, and the line bus unit 104*b* is connected to the other side of the breaker unit 103*b*. An operating device 504 is disposed under the breaker unit 103*b* and a control box 505 is disposed on one side of the operating device 504.

The configuration of the main bus unit 101*b* and 102*b* will be described below. In a main bus unit 101*b*, three-phase electric power lines 192*a*, 192*b* and 192*c* are disposed at respective vertexes of an isosceles triangle. The main bus unit 101*b* and 102*b* is formed by a combination of a first cylindrical vessel portion extending in the axial direction of the bus line conductor 192*a*, 192*b* and 192*c* and the second cylindrical vessel portion extending in the direction perpendicular to the first cylindrical vessel portion. The upper and lower electric power lines 192*a* and 192*b* are arranged in the vertical direction on the center line of the main bus unit 101*b*, and the electric power line 192*c* is arranged on the breaker unit 103*b* side. Flanges are provided at both ends of the cylindrical vessel portion of the main bus unit 101*b* and 102*b*, and an expansion bellows 131 and 132 is connected to one of the ends of the cylindrical vessel portion.

Branch conductors 592*a*, 592*b* and 592*c* of the electric power lines 192*a*, 192*b* and 192*c* are arranged in a row in the vertical direction at the center line portion of the cylindrical vessel portion of the main bus unit 101*b*. A movable electrode 513 of disconnect switch 201*b* is provided at the center portion of each of the branch conductors 592*a*, 592*b* and 592*c*. The movable electrode 513 is driven to be reciprocated in each of the branch conductors 592*a*, 592*b* and 592*c* by an operating device 509 disposed between the two bus line vessels. Fixed electrodes 512 are fixed, via conductors 511, to an insulating spacer 113*b* provided between the main bus unit 101*b* and the breaker unit 103*b*. The movable electrode 513 and the fixed electrode 512 constitute a disconnector. The insulating spacer 113*b*, 114*b* is provided between each of the upper and lower main bus units 101*b*, 102*b* and the breaker unit 103 for keeping air-tightness, and conductor connecting portions 514 are arranged in a row in the horizontal direction at the center line portion of the insulating spacer 113*b*. The conductor connecting portions 514 are connected to conductors 511 in the main bus unit 101*b*.

The configuration of the breaker unit 103*b* will be described below. The vessel of the breaker unit 103*b* is composed of a cylindrical vessel portion 516*a* having an axial line in the vertical direction, and a first horizontal cylindrical vessel portions formed on both sides in the horizontal direction on the upper side of the cylindrical vessel portion 516*a* and a second horizontal cylindrical vessel portion 16*b* formed on the main bus unit side in the horizontal direction on the lower side of the cylindrical vessel portion 516a. Three-phase circuit-breakers 221b are arranged in the perpendicular direction of the bus line conductor 192 at the center line portion of the cylindrical. vessel portion 516b.

The conductor connecting portions 514 provided on the upper insulating spacer 113b are connected to the conductor connecting portions 515 provided on the lower insulating spacer 114b via reciprocating conductors 518, and the lower sides of the reciprocating conductors 515 are connected to the lower sides of the breaking portions of the circuit-breakers 221b via conductors 524

Fixed electrodes 519 of earth devices, which are provided on the lower portions of the reciprocating conductors 518, are allowed to be contacted with or separated from movable electrodes driven by an operating device (not shown) provided outside the vessel of the breaker unit 103b.

Connecting conductors 523 are provided on the upper portions of the circuit-breakers 221b. The connecting conductors 523 are connected to conductor connecting portions 522 arranged in a row in the transverse direction on an insulating spacer 115b provided between the breaker unit 103b and the line bus unit 104b. Branch portions are provided on the connecting conductors 523 on the circuit-breaker portion side, and fixed electrodes 523 of earth devices are provided on end portions of the branch portions. Movable electrodes reciprocated by an operating device (not shown) provided outside the vessel of the breaker unit 103b are allowed to be contacted with or separated from the fixed electrodes 523.

Of the three circuit-breakers 221b, the center circuit-breaker 221b is arranged on the straight line connecting the center conductor connecting portion 514 provided on the insulating spacer 113b to the center conductor connecting portion 522 provided on the insulating spacer 115b; and the side circuit-breakers 221b are located on both the sides of the center circuit-breaker 221b and are each offset outwardly from the straight line connecting the associated conductor connecting portions 514 and 523 to each other for ensuring the insulating distance. Accordingly, at each of the side circuit-breakers 221b, the connecting direction of the conductor 524 faces outwardly. The circuit-breaker 221b is formed into a cylindrical shape; however, the planes of the circuit-breaker 221b in the arrangement direction are flattened, to reduce the width of the circuit-breaker 221b in the arrangement direction. The upper portions of the circuit-breakers 221b are connected to conductor connecting portions 522 arranged in a row in the horizontal direction on an insulating spacer 115b provided between the breaker unit 103b and the line bus unit 104b.

The configuration of the line bus unit 104b will be described below. The vessel of the line bus unit 104b is composed of a cylindrical vessel portion 525b extending in the vertical direction and a cylindrical vessel portion 562 formed in the horizontal direction on the upper portion of the cylindrical portion 525b. Conductors 526 are connected to the conductor connecting portions 522 provided on the insulating space 115b, and movable electrodes 528 reciprocated in the vertical direction by an operating device (not shown) provided outside the vessel of the line bus unit 104b are provided at central portions of the conductors 526. The movable electrode 528 is allowed to be contacted with or separated from a fixed electrode 529. The movable electrode 528 and fixed electrode 529 constitute a disconnector 205b. The fixed electrodes 529 are fixed on conductors 531 directly fixed on cable heads 530. The cable heads 530 are disposed in the lower portion of the cylindrical vessel portion 525b on the side opposed to the breaker unit 103b. Lightning arresters 232b are disposed beside the cable heads 530 on the breaker unit 103b side, and transformers 533 for instruments are disposed over the cable heads 530. The cable heads 530 and the lightning arresters 232b are connected to common conductors 531. Fixed electrodes 534 of earth devices are provided on the conductors 531, and movable electrodes driven by an operating device 635 provided outside the vessel of the line bus unit 104b are allowed to be contacted with or separated from the fixed electrodes 534. The transformers 533 for instruments are allowed to be contacted with or separated from the conductors 531 via separating devices 536.

A frame 537 on which the line bus unit 104b is mounted is disposed under the line bus unit 104b. A bottom plate 538 is provided on the lower portion of the vessel of the line bus unit 104b, and connecting portions 233b, to be connected to cables 540, of the cable heads 530 are extracted from the bottom plate 538 via a sealing portion, and current transformers 234b are mounted to the cables 540.

FIG. 17 is a top view of the gas insulated switching apparatus. As shown in FIG. 16, the three-phase lightning arresters 232b and the three-phase cable heads 530 in the line bus unit 104b are arranged substantially along a concentric circle of the cylindrical vessel portion 525b, wherein the three-phase cable heads 530 are positioned opposite to the breaker unit 103b and the three-phase lightning arresters 232b are positioned on the breaker unit 103b side. With this arrangement, the workability in mounting of the current transformers 234b upon the field installation of the apparatus is improved. The disconnectors 205b are arranged in a row, and are located at positions which are substantially the same as those of the two-phase lightning arresters 232b, apart from the breaker unit 103b, of the three-phase lightening arresters 232b arranged at vertexes of an isosceles triangle. In this way, the three-phase cable heads 530 and the three-phase lightning arresters 232b are arranged in the concentric circle, so that it is possible to make small the outside diameter of the cylindrical vessel portion 525b of the line bus unit 104b. Further, since the cable heads 530 and lightning arresters 232b are arranged on the lower portion of the cylindrical vessel portion 525b and at least the two-phase cable heads 530 are disposed close to the associated two-phase lightening arresters 232b, it is possible to reduce the applied voltage ratio of the lightning arresters 232b and hence to prolong the service life of the lightning arresters 232b.

A monitor 566 is mounted on a side surface of a box for housing the operating device 504 for circuit-breakers 103b under the line bus unit 104b. Earth lines 543 extracted from the lower portions of the lightning arresters 232b are connected to the monitor 566. Since the earth lines 543 are extracted from the lower portions of the lightning arresters 232b, it is possible to shorten the length of each earth line 543 and hence to make small the potential superimposed on the operational potential of the lightning arrester 232b. As a result, it is possible to accurately operate the lightning arresters 232b at the operational potentials.

Figure 18:
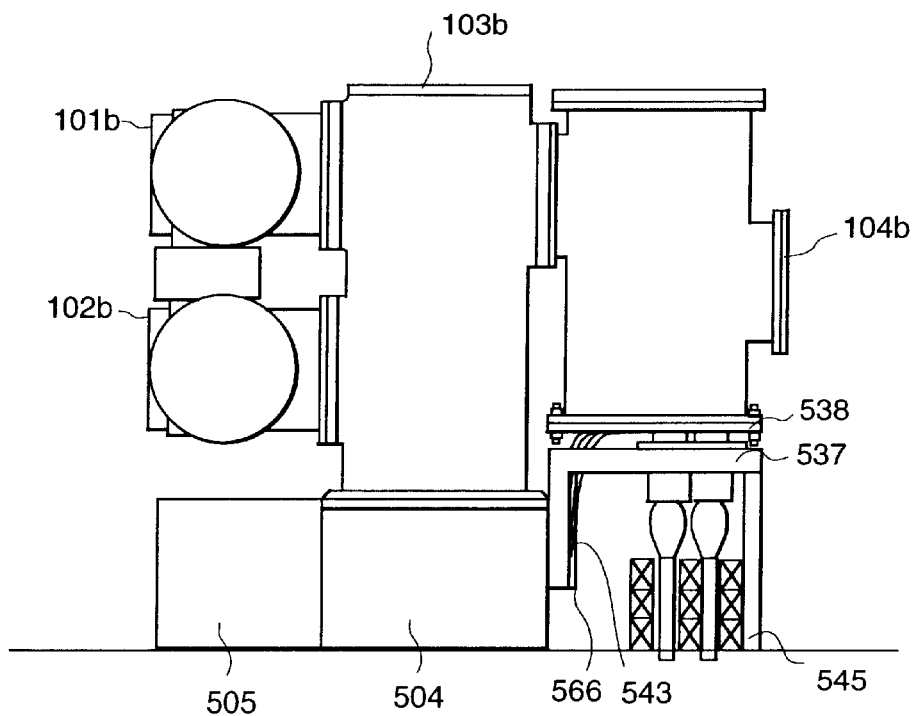
FIG. 18 is a side view, which gas insulated switching apparatus according to another embodiment of the present invention.
Figure 19:
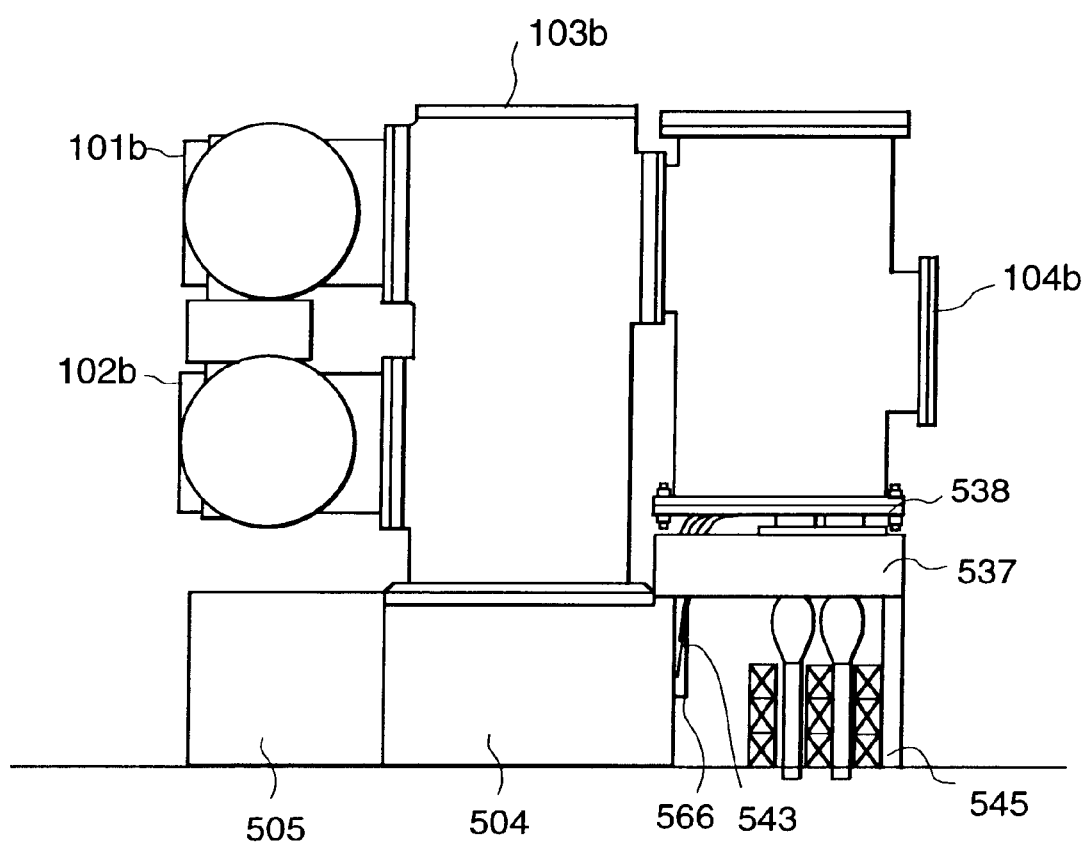
FIG. 19 is a side view, which gas insulated switching apparatus according to another embodiment of the present invention.

Next, the fixation composition of the line bus unit 104b is explained. The line bus unit 104b is fixedly supported as follows: namely, the line bus unit 104b is fixedly connected to the breaker unit 103b with bolts via the insulating spacer 115b provided for keeping air-tightness. The breaker unit 103b is mounted such that flanges provided at the lower end of the vessel 516a are fixed by means of bolts on the box of the operating device 504 for circuit-breakers fixed on the ground. On the other hand, the frame 537 is provided under the line bus unit 104*b*, which frame is composed of a portion parallel to the bottom plate 538 of the line bus unit 104*b* and a portion extending in the direction perpendicular thereto. One of the above portions of the frame 537, formed in an L-shape, is fixed on the bottom plate 538 of the vessel 525*b* of the line bus unit 104*b*, and the other is fixed on the box of the operating device 504 with bolts. The bottom plate 538 is formed of a flat plate having a square shape. Through-holes are provided in four corners of the bottom plate 538, and holes are provided in the frame 537 at positions corresponding to those of the above through-holes of the bottom plate 538. The bottom plate 538 is fixed on the frame 537 with stud bolts 544 passing through the holes formed in the bottom plate 538 and frame 537. Two legs 545 are mounted on the frame 537 at positions opposed to the breaker unit 103*b* side. It should be noted that the shape and mounting position of the frame 537 are not limited to those shown in FIG. 1 but may be modified, for example, as shown in FIGS. 18 and 19. That is to say, one end of the rectangular or L-shaped frame 537 may be fixed on the side surface of the box of the operating device 504.

In this way, the line bus unit 104*b* is supported by the breaker unit 103*b* fixed on the box of the operating device 504 and the frame 537 fixed on the box of the operating device 504. Since the line bus unit 104*b* is fixedly supported as described above, the two pieces of legs 545 can be removed in the case of mounting the current transformers 234*b* and the like.

By miniaturizing the gas insulated switching apparatus, the apparatus can be transported to the installation field by a trailer after being assembled in the workshop. In this case, however, upon the field installation of the apparatus, it is required to carry out a work of connecting the cables 540 to the cable connecting portions 233*b* and mounting the current transformers 234*b* to the cables 540. According to this embodiment, upon such installation work, the legs 545 can be removed, so that it is possible to improve the workability in mounting of the heavy current transformers 234*b*.

Further, since the frame is fixed on the box of the operating device, the gas insulated switching apparatus can be integrally mounted. Additionally, by providing holes for jack-up in the box of the operating device, a carrying base can be integrally removed or mounted using the holes for jack-up.

As described above, according to the present invention, since the legs of the line bus unit are removed and thereby the current transformers are easily mounted, it is possible to improve the workability in installation of the gas insulated switching apparatus.

What is claimed is:

1. A gas insulated switchgear apparatus, comprising main bus units which have main buses, a breaker unit which has a breaker, an electric power line which connects said main buses with said breaker and a disconnect switch which is provided on said electric power line, wherein said disconnect switch is operable to disconnect one of said main buses from said breaker.

2. A gas insulated switchgear apparatus as claimed in claim 1 which comprises:

said breaker unit has an additional disconnect switch which is located in said breaker unit and said additional disconnect switch operates to disconnect the other of said main buses from said breaker.

3. A gas insulated switchgear apparatus as claimed in claim 1, wherein said breaker unit has a spacer for spacing said main bus unit from said breaker unit, and said breaker unit has an insulated gas in the inside of said breaker unit.

4. A gas insulated switchgear apparatus as claimed in claim 3, wherein said breaker unit has a spacer for spacing said disconnect switch from said breaker unit.

5. A gas insulated switchgear apparatus as claimed in claim 1, wherein said electric power line is composed of a three-phase electric line.

6. A gas insulated switchgear apparatus comprising main bus units which have main buses, a breaker unit which has a breaker, an electric power line which connects said main buses to said breaker wherein a connection between one of said main buses and said breaker is capable of being cut-off.

7. A gas insulated switchgear apparatus as claimed in claim 6, wherein a connection between the other of said main buses and said breaker is capable of being cut-off.

8. A gas insulated switchgear apparatus as claimed in claim 6, wherein said breaker unit has a spacer for spacing said main bus unit from said breaker unit, and an insulated gas is held in said breaker unit.

9. A gas insulated switchgear apparatus, comprising main bus units which have main buses, a breaker unit, a line side unit an electric power line a circuit breaking means for switching said electric power line of main bus unit and said electric power line of said line side unit, which is located in said breaker unit, and a circuit disconnect means for disconnecting one of said main buses from said circuit breaking means.

10. A gas insulated switchgear apparatus as claimed in claim 9, wherein said breaker unit has a second circuit disconnect means to disconnect the other of said main buses from said circuit breaking means.

11. A gas insulated switchgear apparatus as claimed in claim 10, wherein said breaker unit has a spacer for spacing said main bus unit from said breaker unit, and an insulated gas holding means for holding an insulated gas in said breaker unit.

12. A method for repairing a gas insulated switchgear apparatus which has main bus units which have main buses, a breaker unit which has a breaker, an electric power line which connects said main buses with said breaker and a disconnect switch which is provided on said electrical line comprising:

opening said disconnect switch, changing said main bus unit which is connected to said opened disconnect switch, and closing said opened disconnected switch.

13. A repairing method for a gas insulated switchgear apparatus as claimed in claim 12 which comprises:

after said main bus unit is removed, a protective cover is connected to said breaker unit.

14. A repairing method for a gas insulated switchgear apparatus as claimed in claim 12, wherein said breaker unit has a spacer for spacing said main bus unit from said breaker unit, said main bus unit has an insulated gas, and after opening said disconnect switch, reducing said insulated gas.

* * * * *